United States Patent [19]

Satake et al.

[11] Patent Number: 4,466,544

[45] Date of Patent: Aug. 21, 1984

[54] PHOTOELECTRIC DETECTION DEVICE FOR COLOR SORTING APPARATUS

[75] Inventors: Toshihiko Satake; Hideki Sakaki, both of Higashihiroshima, Japan

[73] Assignee: Satake Engineering Co., Ltd., Tokyo, Japan

[21] Appl. No.: 371,239

[22] Filed: Apr. 23, 1982

[30] Foreign Application Priority Data

May 14, 1981 [JP] Japan .................................. 56-73036

[51] Int. Cl.³ .............................................. B07C 5/342
[52] U.S. Cl. .................................... 209/580; 356/416; 356/418
[58] Field of Search ............... 350/438, 439, 482, 483, 350/252, 254; 356/402, 416, 418, 419; 209/580, 581, 576, 577

[56] References Cited

U.S. PATENT DOCUMENTS 3,628,871 12/1971 Himmelstrup ....................... 350/438
3,738,484 6/1973 Hoover et al. ....................... 209/581
4,120,402 10/1978 Swanson ............................. 209/580

Primary Examiner—Robert B. Reeves
Assistant Examiner—Glenn Foster
Attorney, Agent, or Firm—Norbert P. Holler; Charles A. Blank

[57] ABSTRACT

A color sorting apparatus has a chute from which grains come out in the form of a linear flux, a photoelectric detection device surrounding the flux and including light sources, light-receiving units each having a lens barrel having a filter unit and adapted to receive the light reflected by or transmitted through the flux of grains, and a jet nozzle which provides a jet of air in accordance with the signal from the light receiving units thereby to blow unwanted grains of different colors away from the flux, so that the desired grains and unwanted grains are separated from each other according to their colors. The filter unit consists of a plurality of filters carried by a plate member which is movably mounted on the lens barrel.

4 Claims, 6 Drawing Figures

PHOTOELECTRIC DETECTION DEVICE FOR COLOR SORTING APPARATUS

The present invention relates to an improvement in the photoelectric detection device for use in color sorting apparatus which is used for separating unwanted grains from desired grains such as soybeans, adzuki beans, rice grains and so forth according to their colors.

The color sorting apparatus of the type described above usually has light sources adapted to apply light to the grains flowing down from a chute, and light receiving units each being provided with a lens barrel having a filter and other parts and adapted to receive the light reflected by or transmitted through the flux of the flowing grains. The apparatus further has a control circuit adapted to produce a control signal in accordance with the difference in the quantity of reflected or transmitted light between the desired grain having an ordinary color and unwanted grains of different colors. A jet nozzle is operated in accordance with the control signal so as to blow off the grains of different colors.

In the conventional apparatus of the type described above, it is necessary to prepare a plurality of filters for sorting a different kinds of grains such as unhulled rice, polished rice, adzuki beans and so forth, and to take a manual labour for changing the filter at each time the kind of the grain to be sorted is changed. The preparation of a plurality of filters raises the cost uneconomically and requires a trouble of storage of such filters. In addition, the manual work for changing the filter is extremely time-consuming and troublesome.

To obviate these problems, it has been proposed to use a single filter of an intermediate color adaptable to a plurality of kinds of grains of similar colors. In this case, however, the distinction of the reflected or transmitted light is decreased to cause an erroneous operation thereby to seriously deteriorate the sorting performance of the apparatus.

Accordingly, an object of the invention is to provide an improved photoelectric detection device for color sorting apparatus, capable of overcoming the above-described problems of the prior art.

To this end, according to the invention, there is provided a photoelectric detection device in which the filter mounted in the lens barrel of the light receiving unit can be changed to another desired filter by a simple operation. In consequence, the time and labour for changing the filter are saved advantageously and higher sorting performance of the color sorting apparatus is ensured.

Namely, according to one aspect of the invention, there is provided, in a color sorting apparatus having a chute from which grains are made to flow out in the form of a linear flux, a photoelectric detection device surrounding the flux and including light sources arranged across the flux, light receiving units each having a lens barrel accomodating a lens, a filter unit and so forth and disposed to optically oppose to the light sources and reference color plates, and a jet nozzle adapted to operate in accordance with the signal from the photoelectric detection device thereby to blow unwanted grains of different colors from the flux, an improvement in the photoelectric detection device wherein the filter unit includes a plurality of filters of different colors carried by a movable plate member provided on the lens barrel.

According to another aspect of the invention, there is provided a photoelectric detection device of the type mentioned above, wherein the filters are provided on a substantially sector-shaped plate member to take positions on an arc, the sector-shaped plate member being carried by a rotary shaft perpendicular to the plate member.

According to still another aspect of the invention, there is provided a photoelectric detection device of the first-mentioned type, wherein said filters are provided on a disc-shaped plate member to take positions of a circle concentric with said plate member, said plate member being carried by a rotary shaft perpendicular to said plate member.

By way of example only, certain illustrative embodiments of the invention will now be described with reference to the accompanying drawings in which.

Figure 1:
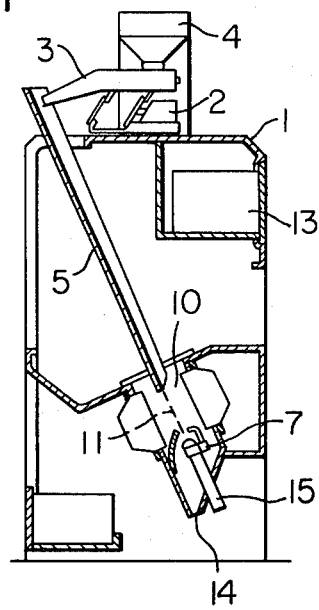
FIG. 1 is a sectional view of a color sorting apparatus incorporating a photoelectric detection device in accordance with the invention.
Figure 2:
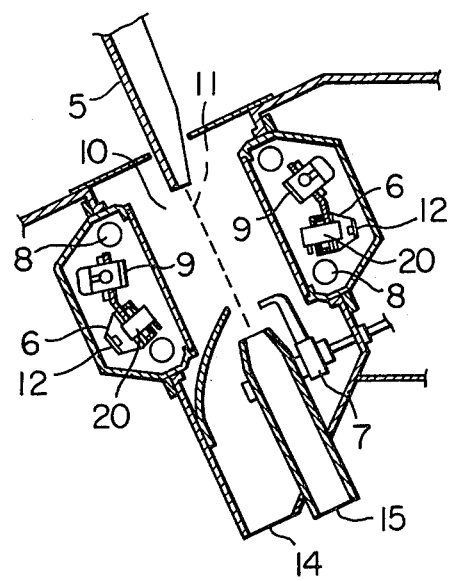
FIG. 2 is an enlarged sectional view of a photoelectric sorting chamber of the color sorting apparatus shown in FIG. 1.

Referring to FIGS. 1 and 2, a color sorting apparatus to which the invention is applied has a housing 1 on which mounted is a feeder 3 equipped with a vibrator 2. A hopper 4 is provided at the supply side of the feeder 3 while a chute 5 is disposed at the discharge side of the same. The chute 5 is connected at its lower end to a photoelectric sorting chamber 10 accomodating light receiving units 6, an air jet nozzle 7, light sources 8 and reference color plates 9. The light sources 8 are adapted to apply light to the flux 11 of grains containing desired grains of ordinary color and unwanted grains of different colors coming linearly out from the chute 5. The lights reflected by or transmitted through the flux 11 are detected by the light receiving units 12. Signals from the light receiving units 12 are delivered to a control circuit 13 which in turn produces a control signal for activating the jet nozzle 7. In consequence, the unwanted grains of different colors are blown by the air from the nozzle 7 away from the flux 11 and are discharged through the discharge hole 14 provided at the bottom, whereas the expected grains of ordinary color are taken out of the apparatus through a grain collecting sleeve 15.

Figure 3:
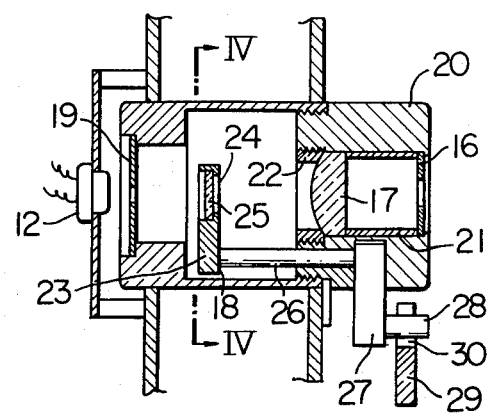
FIG. 3 is an enlarged sectional view of a light receiving unit of a photoelectric detection device in accordance with an embodiment of the invention.
Figure 4:
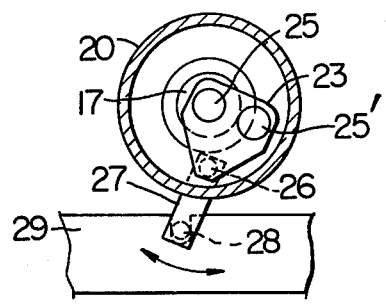
FIG. 4 is a sectional view taken along the line IV—IV of FIG. 3.

A photoelectric detection device in accordance with an embodiment of the invention will be explained hereinunder with reference to FIGS. 3, 4 and 5. A lens barrel 20 accomodates, in a mentioned order, a slit plate 16, converging lens 17, filter unit 18 and a slit plate 19 arranged on the path of light emitted from the light source and then reflected by or transmitted through the flux 11 of grains. The light is then received by a light-receiving element 12. Reference numerals 21 and 22 denote, respectively, a lens spacer sleeve and a lens fixing member, respectively. The filter unit 18 consists of a plurality of filter elements of different colors and are mounted on a movable plate member. In the embodiment shown in FIGS. 3, 4 and 5, a substantially sector-shaped plate member 23 is used and a plurality of apertures 24, 24 are formed in the sector-shaped plate member 23 so as to take positions on an arc concentric with the sector-shaped plate member 23. Filters 25, 25' of different colors are fitterd in these apertures 24, 24. A rotary shaft 26 is fixed to the radially inner end of the sector-shaped plate member 23 so as to extend therefrom at a right angle to the plane of the plate member, and is rotatably mounted on the lens barrel 20. The other end of the rotary shaft 26 is fixed to a supporting rod 27 which projects to the outside of the lens barrel. A pin 28 provided on the supporting rod 27 is fitted in a recess 30 formed in a connecting rod 29 which extends at its one end to the end of the housing 1. A filter changing handle 31 is attached to the projected end of the connecting rod 29. The arrangement heretofore described is provided for each of the light receiving device. Namely, it is usual to provide in a color sorting apparatus a plurality of sorting units arranged side by side each of which including a feeder, a chute and a photoelectric detection device when there are a plurality of light receiving devices as in the case of the illustrated embodiment, the members such as plate member 23, supporting rod 27 and so forth are arranged in plural, and the supporting rods 27 are connected to a common connecting rod 29 through respective pins 28, as will be clearly seen from FIG. 5.

Figure 5:
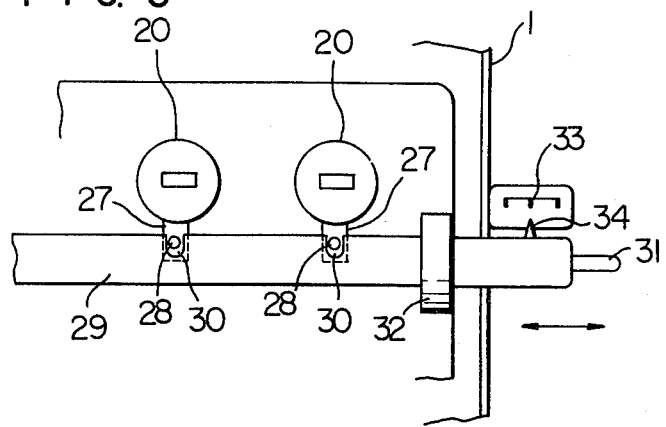
FIG. 5 is an illustration of operation of lens barrel of the light receiving unit.

In operation, the connecting rod 29 is axially moved as shown by arrows in FIG. 5 by means of the handle 31 so that a switching is made between the filter 25 and the filter 25' in each light receiving device. A reference numeral 32 denotes a guide plate, 33 denotes a scale for showing the kinds of grains and 34 denote a hand attached to the connecting rod 29 and adapted to indicate the kind of the grain in cooperation with the scale 33. For making a sorting of a different kind of grain, the connecting rod 29 is manipulated by the handle 31 until the hand 37 is moved to point the designated kind of grain. In consequence, the rotary shafts 26 are rotated through the pins 28 and the supporting rods 27 and thus bring the filter corresponding to the designated grain into the operative position.

Figure 6:
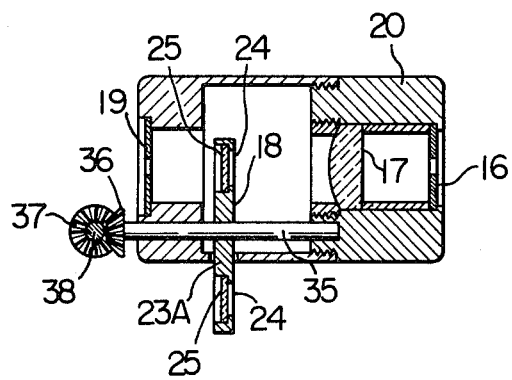
FIG. 6 is a sectional view of the lens barrel of a light receiving unit in a photoelectric detection device in accordance with another embodiment of the invention.

FIG. 6 shows another embodiment in which a multiplicity of aperture 24 . . . are formed at a suitable circumferential pitch in a disc-shaped plate member 23A. Filters 25 . . . of different colors are fitted in these apertures. A rotary shaft 35 is fixed to the center of the disc-shapud plate member 23A at a right angle to the plane of the disc-shaped plate member. The rotary shaft 35 is carried rotatably by the lens barrel and is provided at its one end with a bevel gear 36 meshing with another bevel gear 37 mounted on an operation shaft 38 which is operable from the outside of the housing 1, thereby to change the filter by an external manipulation. According to this embodiment, it is possible to sort a greater number of kinds of grains with a single sorting apparatus. Needless to say, the plate member 23A can have a polygonal shape, sector-shape or other shape as required, as well as the described circular shape.

As has been described, according to the invention, a plate member carrying a plurality of filters of different colors are mountd in the lens barrel of each light receiving unit, so that the change of the filter can be made quite easily by a simple manipulation of the handle in quite a short period of time. This means that the time length of suspension of operation of the sorting apparatus for changing the filters is diminished, while the sorting apparatus is suited for a variety of kinds of grains at a higher precision and performance of sorting for each kind of grain.

What is claimed is:

1. In a color sorting apparatus comprising at least one chute having an upstream end and a downstream end; means for feeding a mixture of grains having a desired color and grains having different colors onto said upstream end of each chute to allow the mixture to flow down along each chute and to be shot out of said downstream end thereof along a predetermined path; light source means for applying light to the grains passing along said predetermined path to allow the light to be reflected by and/or transmitted through the grains passing along said predetermined path; control means for receiving a below-mentioned light signal to generate a control signal; and means operative in response to the control signal from said control means for deflecting the grains having different colors out of said predetermined path, a photoelectric detection device including at least one lens barrel having therethrough a bore through which passes the light reflected by and/or transmitted through the grains, a light-receiving element receiving the light passing through said bore in said lens barrel to generate said light signal, a movable member movably supported by said lens barrel, a plurality of filters carried on said movable member, and actuator means for actuating said movable member to move the same so as to allow a selected one of said filters to be aligned with said bore in said barrel.

2. A photoelectric detection device as defined in claim 1, wherein said movable member is a substantially sector-shaped plate member pivotable around a pivotal axis extending substantially parallel to an axis of said bore in said lens barrel, said filters carried on said sector-shaped plate member being moved along an arcuate path around said pivotal axis when said sector-shaped plate member is actuated by said actuator means.

3. A photoelectric detection device as defined in claim 2, wherein said movable member is a disc-shaped plate member rotatable around a central axis thereof extending substantially parallel to an axis of said bore in said lens barrel, said filters carried on said disc-shaped plate member being moved along a circular path around said central axis when said disc-shaped plate member is actuated by said actuator means.

4. A photoelectric detection device as defined in claim 2 for use in a color sorting apparatus in which there are provided a plurality of chutes arranged in side-by-side relation in a single plane, wherein there are provided a plurality of lens barrels disposed at at least one side of said single plane with one lens barrel associated with each of said chutes, said actuator means including shafts with one rotatably supported by each of said lens barrels and with one having fixedly mounted thereon said movable member, and a common actuator member operatively connected to said shafts to angularly move the same around their respective axes.

* * * * *